Sept. 30, 1952   E. R. DUDLEY, JR   2,612,170
CORN HUSKING MACHINE
Filed Sept. 21, 1948   3 Sheets-Sheet 1

INVENTOR.
EDMOND R. DUDLEY JR.
BY
Mellin and Hanscom
ATTORNEYS

Sept. 30, 1952     E. R. DUDLEY, JR     2,612,170
CORN HUSKING MACHINE

Filed Sept. 21, 1948     3 Sheets-Sheet 2

INVENTOR.
EDMOND R. DUDLEY JR.
BY
Mellin and Hanscom
ATTORNEYS

Sept. 30, 1952  E. R. DUDLEY, JR  2,612,170
CORN HUSKING MACHINE
Filed Sept. 21, 1948  3 Sheets-Sheet 3
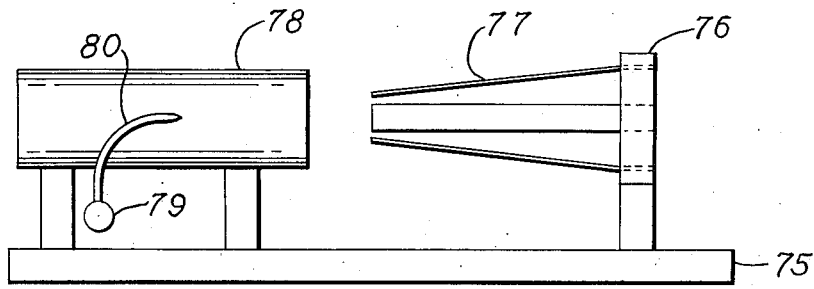
Fig_6_
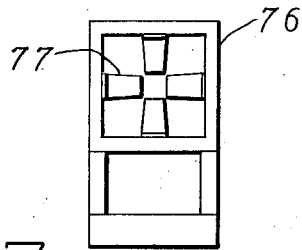
Fig_7_
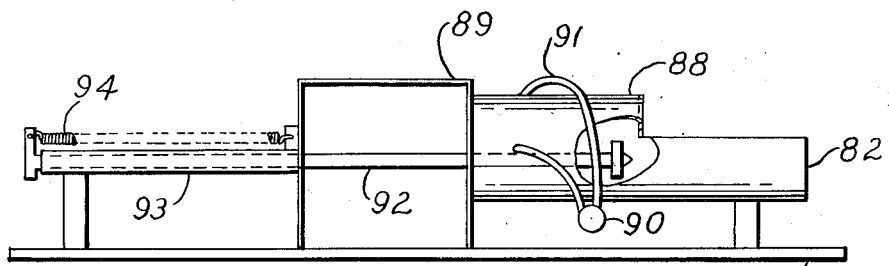
Fig_8_
INVENTOR.
EDMOND R. DUDLEY JR.
BY
Mellen and Hanscom
ATTORNEYS Patented Sept. 30, 1952

2,612,170

UNITED STATES PATENT OFFICE 2,612,170

CORN HUSKING MACHINE

Edmond R. Dudley, Jr., San Jose, Calif.

Application September 21, 1948, Serial No. 50,383

3 Claims. (Cl. 130—5)

This invention relates to a machine for removing husks and silk from ears of corn.

Corn husking machines heretofore provided have suffered from various disadvantages. Some such machines subject the ears of corn to rough, mechanical treatment, as by rollers, resulting in damage to the kernels of corn. Other machines do not perform the dehusking and desilking operations efficiently, e. g., they do not remove the silk from the ears of corn.

It is desirable to provide a corn husking machine which is operable to remove the husks and the silk from ears of corn rapidly and economically and without damage to the kernels of corn. This is particularly desirable in dehusking and desilking ears of green corn for packaging for the fancy grocery trade.

It is an object of the present invention to provide an improved corn husking machine.

It is a further object of the invention to provide a machine for dehusking and desilking ears of corn which is simple in design, easy and dependable in operation, and which efficiently removes the husk and the silk from the corn without damaging the kernels.

These and other objects of the invention will be apparent from the ensuing description and appended claims.

The invention is exemplified in the following description and is illustrated by way of example in the accompanying drawings, in which:

Fig. 6 is a view in side elevation of a second embodiment of the invention;

Fig. 7 is a view in end elevation as viewed from the right of Fig. 6;

Fig. 8 is a view in side elevation, partly broken away, of a third embodiment of the invention.

Figure 1:
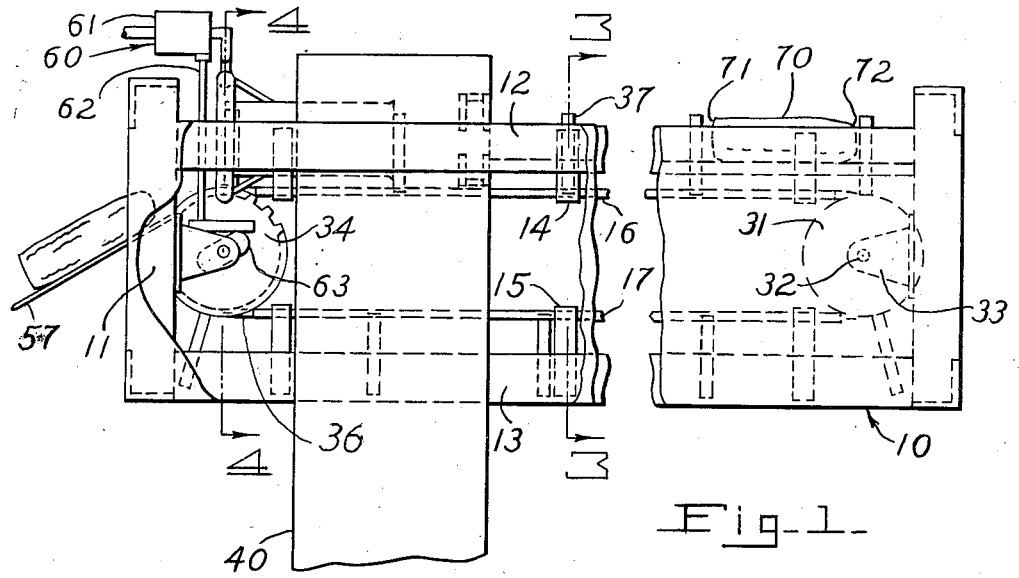
Fig. 1 is a fragmentary view in side elevation of the preferred embodiment of the invention.

Referring now to the drawings and more particularly to Figs. 1 to 4, the corn husking apparatus of the invention comprises a frame 10 including upright posts 11 and upper and lower horizontal members 12 and 13. A plurality of upper straps 14 and lower straps 15 are provided, being welded or otherwise suitably secured to the horizontal frame members and serving to support upper and lower track or guide members 16 and 17, respectively. A casing 18, which is conveniently formed of galvanized sheet metal, is also provided, being bolted to the frame members by bolts 19. The upper portion of the casing 18 is depressed to form a trough or slide 20, the ends of the casing being spaced somewhat apart to provide a slot 21 for a purpose explained hereinafter.

A rearward sprocket 31 is fixed to a shaft 32 which is journaled in bearings 33, and a similar, forward sprocket 34 is fixed to a shaft 35 journaled in bearings 33a, the bearings 33 and 33a being secured to the framework as shown. Trained about the sprockets 31 and 34 is a conveyor chain 36 having lugs 37, the conveyor chain being received within and guided by the above mentioned track members 16 and 17 and the lugs extending through the slot 21 into the slide 20.

Figure 2:
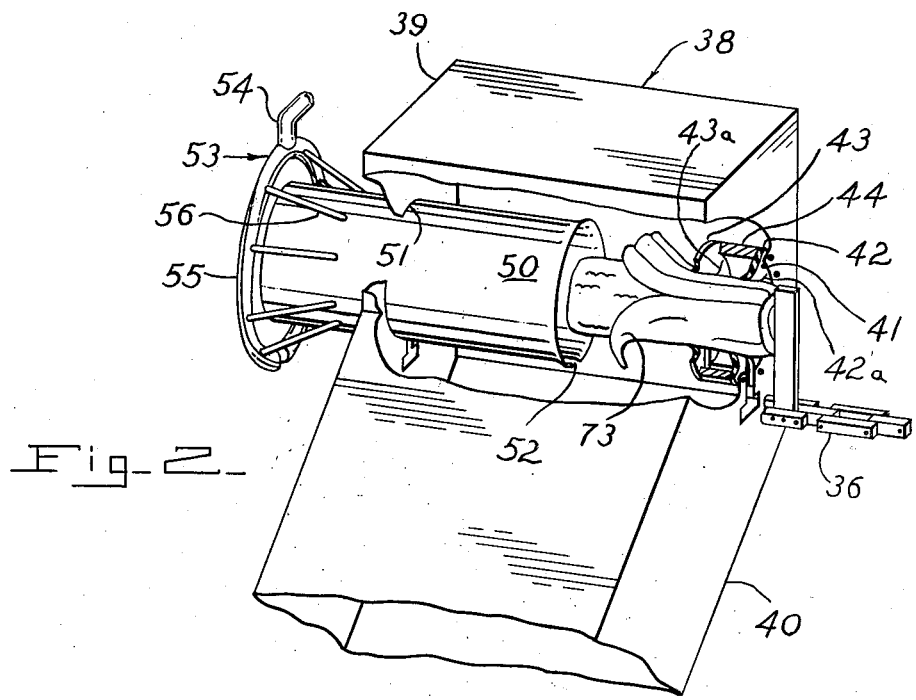
Fig. 2 is a perspective view of the corn husking assembly.
Figure 3:
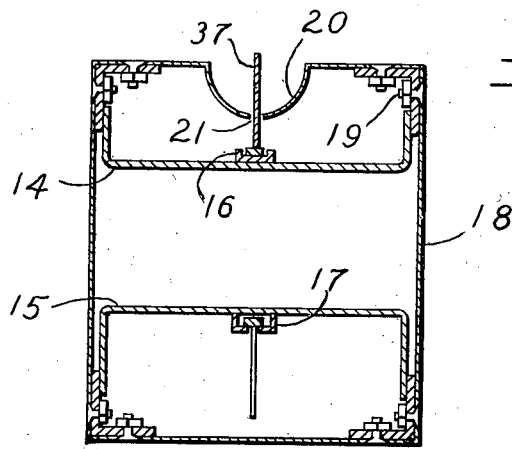
Fig. 3 is a transverse section taken along line 3—3 of Fig. 1 showing the details of the corn conveying mechanism.
Figure 5:
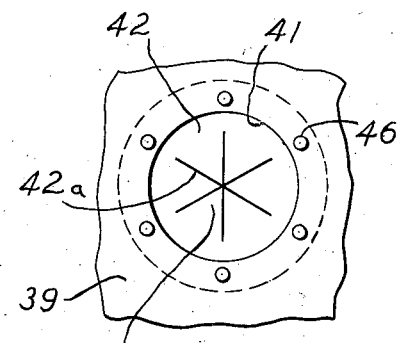
Fig. 5 is a view in elevation of one of the centering diaphragms.
Figure 4:
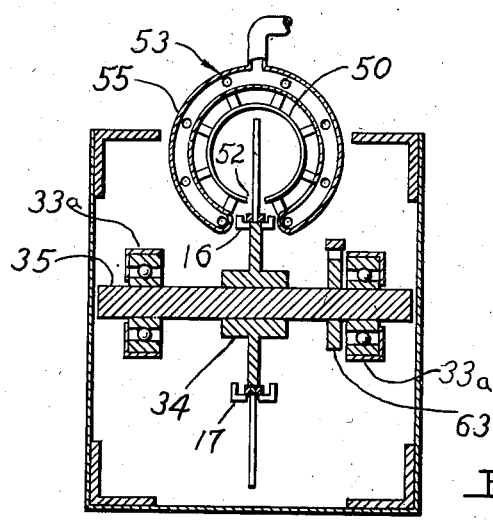
Fig. 4 is a transverse section taken along the line 4—4 of Fig. 1 showing an end view of the corn husking assembly.

Near the forward end of the machine is a corn husking assembly designated generally as 38 and best shown in Fig. 2. Thus assembly comprises a casing 39 open at its lower end to a chute 40. Disposed within the rearward end of the casing 39 and in alignment with an opening 41 formed in the casing, are a pair of rubber diaphragms 42 and 43 spaced apart by a spacer 44. Each diaphragm is provided with a plurality of slots 42a or 43a radiating outwardly from a common center. These centers are aligned with each other and with the opening 41 in the casing 39, and the slots of each diaphragm form a plurality of flaps 45 forming a yieldable closure as and for a purpose described hereinafter. The diaphragm assembly is secured to the casing by any suitable means, such as bolts or screws 46.

Forwardly of the diaphragm assembly is disposed a cylindrical corn husking tube 50 which is received within an opening 51 formed in the forward end of the casing, such tube being aligned with the diaphragms 42 and 43 and being supported by the casing and by any other suitable means (not shown) as may be necessary. The husking tube 51 is provided at its bottom with a slot 52 extending from end to end thereof. At the forward end of the husking tube 51 is disposed a manifold 53 comprising an air inlet pipe 54 and a split tubular ring 55. Radiating rearwardly and inwardly from the ring 55 are branch ducts or pipes 56 which open into the interior of the corn husking tube 51, the inner ends of the ducts 56 being tangent to elements of the tube.

As illustrated, at the forward end of the machine there is also provided a corn slide or chute 57 and there is also provided a timing device generally designated as 60. Such timing device comprises a valve 61 actuated by a rod 62 which is reciprocated by a cam 63 secured to the shaft 35.

In operation, the apparatus thus described functions as follows: Ears of corn 70, which have had their ends cut off at 71 and 72, are loaded manually or automatically at the rear or righthand end of the machine as viewed in Fig. 1. The lugs 37 propel the ears forwardly to the husking assembly 38. The diaphragms 42 and 43 provide two point support for and serve to center and guide each ear of corn so as to align it coaxially of the husking tube 50. The tube 50 may itself be provided with centering means (not shown). Meanwhile, compressed air, preferably under a high pressure such as 100 to 200 pounds gauge, is admitted through the manifold 53, either intermittently with the aid of the timing mechanism 60, or continuously, in which latter case the timing mechanism is rendered inoperative. If the timing mechanism is employed, the cam 63 will have a contour such as to inject air as each ear enters the tube 50. The air jets thus introduced effectively strip both the husk 73 and the silk from the ears of corn without damaging the kernels of corn. The husks and silk drop into the chute 40 and the dehusked and desilked ears travel forwardly and drop down the chute 57.

In designing the diaphragms 42 and 43 and the husking tube 50, and in installing the same, as noted the diaphragms are disposed close to the tube. The flaps 45 of the diaphragms are preferably of a length such as to provide firm support for the ears of corn but to allow ears of varying size to pass through without undue resistance. The tube 50 is preferably of as small a diameter as possible consistent with the size of ears of corn that are to pass through it, to the end that the jets of air will be confined to as small a space as possible.

An alternative embodiment is shown in Figs. 6 and 7. As there shown, a base 75 is provided, and supported upon the base at one end thereof is a rectangular frame 76 from which project a plurality of forwardly and inwardly extending corn guide strips 77, which are advantageously made of flexible metal. Forwardly of the frame member and corn guide is disposed a cylindrical husking tube 78 which is supplied with steam or compressed air through a manifold 79 and branch ducts 80. The ducts 80 communicate with the interior of the husking tube 78, their outlet ends being tangent to elements of the tube.

In the operation of this device, ears of corn are fed forwardly through the frame 76 and corn guide strips 77. Such feeding may be accomplished manually or automatically, and by a ramming device or a continuous conveyor (not shown). Meanwhile steam or compressed air is admitted to the husking tube 78 through the manifold 79 and branch ducts 80. The ears of corn are dehusked and desilked in the same manner as described above with reference to Figs. 1 to 4.

Referring now to Fig. 8, there is shown a third embodiment of the invention in which there is provided a base 81 upon which, at one end, is supported a feed chute 82 and husking tube 88. At the forward end of the husking tube 88 there is provided a discharge casing 89, and the husking tube 88 is provided with steam or compressed air through a manifold 90 and branch ducts 91, which latter open tangentially to the interior of the husking tube 88 but in a forward direction, as shown. A plunger 92 is also provided, such plunger being supported and guided by means of a guide member 93 and urged forwardly by means of a coil spring 94.

In operation, this form of apparatus functions as follows: Ears of corn are fed to the feed chute 82, and they are sucked forwardly into the tube 88 by means of suction resulting from the steam jets introduced into the husking tube 88 through the branch ducts 91. The plunger 92 retards movement of the ears of corn sufficiently to allow the stream of air and steam to strip off the husk and silk. The dehusked and desilked ears of corn, and the husks and silk removed therefrom, pass forwardly and drop into the discharge casing 89. Coil spring 94 returns the plunger 93.

It will thus be seen that apparatus has been provided for dehusking and desilking ears of corn, which apparatus is simple in construction and operation and employs pneumatic means for the dehusking and desilking operation. Such apparatus, and especially that of the preferred embodiment illustrated in Figs. 1 to 4, is highly efficient in its operation. The husks and silk are completely removed from the ears of corn, and little or no damage is done to the kernels of corn. Thus, the machine is adapted to dehusking and desilking green corn for packaging for the fancy grocery trade.

While I have shown the preferred form of my invention, it is to be understood that various changes may be made in its construction by those skilled in the art without departing from the spirit of the invention as defined in the appended claims.

I claim:

1. A corn husking machine comprising a tube having a diameter substantially no greater than an ear of corn, means for introducing fluid under pressure into said tube and creating a unidirectional, axial flow of fluid therethrough and means for moving ears of corn through said tube in axial alignment therewith and countercurrent to the flow of fluid therethrough.

2. A corn husking machine comprising a tube having a diameter substantially no greater than an ear of corn, a continuous conveyor for conveying ears of corn through said tube, and air inlets for said tube so disposed as to direct air through said tube countercurrent to the movement of said ears.

3. A corn husker comprising: a tube; an endless corn conveyor arranged to move ears of corn through said tube; a fluid manifold mounted on said tube; fluid conduits communicating at their outer ends with said manifold and at their inner ends with the interior of said tube for directing fluid streams within said tube in a direction reverse to the passage of ears of corn therethrough; and a radially split flexible diaphragm disposed adjacent the inlet side of said tube and in axial alignment therewith, said diaphragm serving to center said corn as it advances into said tube.

EDMOND R. DUDLEY, Jr.

REFERENCES CITED

The following references are of record in the file of this patent:

UNITED STATES PATENTS

| Number | Name | Date |
|---|---|---|
| 746,530 | Latchford | Dec. 8, 1903 |
| 796,481 | Weiss | Aug. 8, 1905 |
| 820,329 | Allen | May 8, 1906 |
| 1,307,046 | Getz et al. | June 17, 1919 |
| 2,037,661 | Knight | Apr. 14, 1936 |
| 2,086,960 | Rosenthal et al. | July 13, 1937 |
| 2,217,945 | Digre | Oct. 15, 1940 |
| 2,445,881 | Hemmeter | July 27, 1948 |